Dec. 17, 1940.  W. R. HARRISON  2,225,268
CAMERA FOR PRODUCING SEPARATION NEGATIVES
Filed Dec. 5, 1938  2 Sheets-Sheet 1

INVENTOR.
William R. Harrison.
By William C. Linton.
Atty.

Dec. 17, 1940.  W. R. HARRISON  2,225,268
CAMERA FOR PRODUCING SEPARATION NEGATIVES
Filed Dec. 5, 1938   2 Sheets-Sheet 2
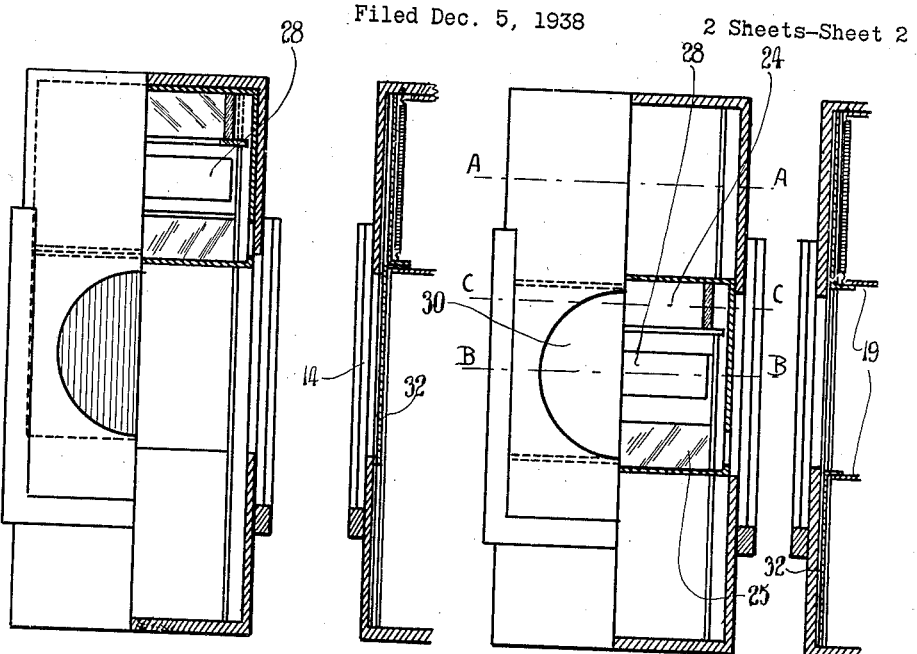
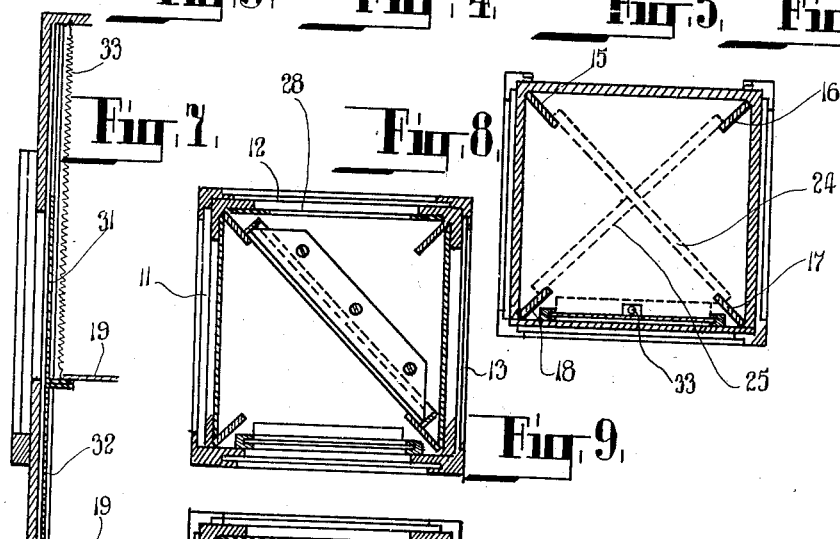
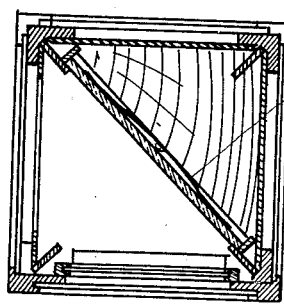
INVENTOR.
William R. Harrison.
By William C. Linton.
Atty.

Patented Dec. 17, 1940

2,225,268

UNITED STATES PATENT OFFICE 2,225,268

CAMERA FOR PRODUCING SEPARATION NEGATIVES

William Reginald Harrison, Perth, Western Australia, Australia

Application December 5, 1938, Serial No. 244,109
In Australia May 31, 1938

1 Claim. (Cl. 95—2)

This invention relates to a camera for producing separation negatives.

The camera is suitable for producing the separation negatives required for colour photography. It transmits a plurality of images that are passed through coloured filters on to light sensitive material.

The invention consists broadly in a camera that has a moving carriage with two totally reflecting mirrors set at different angles so as to reflect two images in different directions. A third image may be directly transmitted through an opening at the back of the moving carriage.

Figure 1:
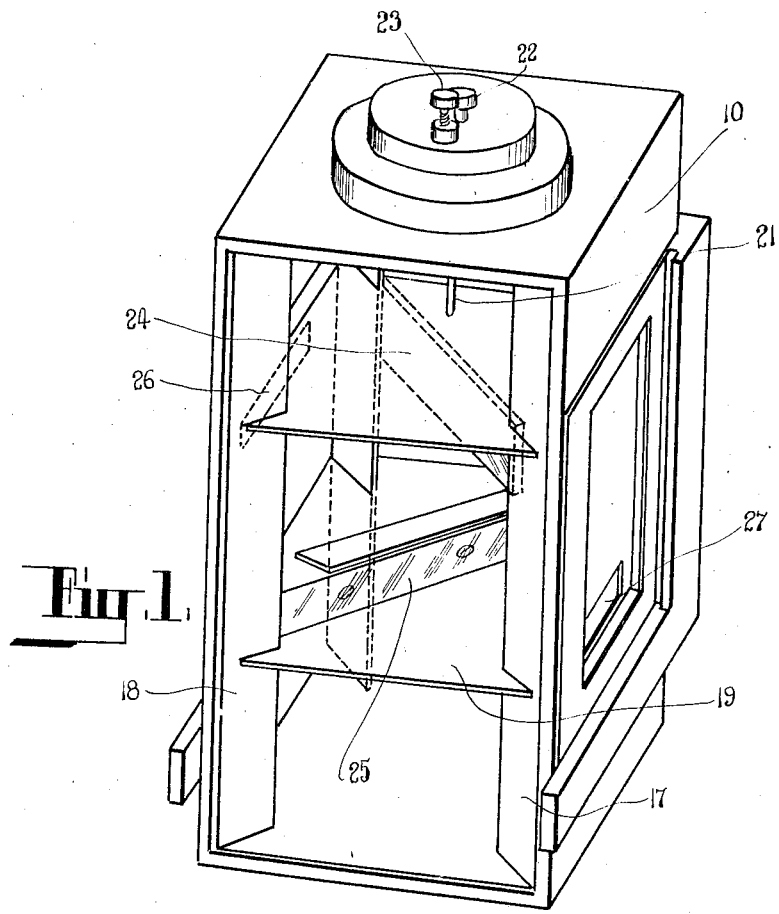
Figure 2:
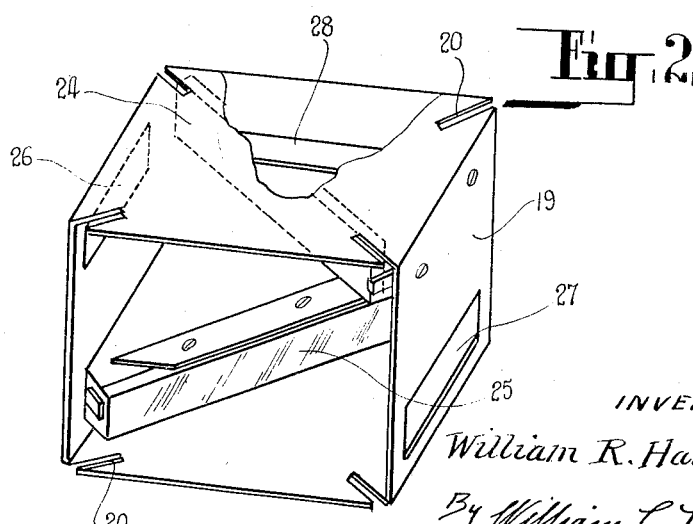

A suitable form of the invention is that illustrated in the accompanying drawings. In these drawings Fig. 1 is a perspective view of the camera with the front slide holding the lens and the shutters removed; Fig. 2 is a perspective view of the moving carriage; Fig. 3 is a half sectional front elevation of the camera when the moving carriage is in the upper position; Fig. 4 is a sectional side elevation through the front portion of the camera in a similar position to the previous figure; Fig. 5 is a half sectional front elevation when the moving carriage is in the central position; Fig. 6 is a sectional side elevation through the front of the camera when the carriage is in the same position as in the previous figure; Fig. 7 is a side elevation sectional through the front to show the position of the shutters when the carriage is in the bottom position; Fig. 8 is a sectional plan on the line A—A of Fig. 5; Fig. 9 is a sectional plan on the line B—B of Fig. 5 and Fig. 10 is a sectional plan on the line C—C of Fig. 5.

As shown in the drawings the camera is referenced 10. It has slide guides 11, 12 and 13 on the two sides and the back for holding the slides containing the light sensitive material and it has a front slide 14 for supporting or guiding moving shutters and the lens. The camera at the corners has vertical guides 15, 16, 17 and 18 and there is a moving carriage 19 having slots 20 to allow it to move and be guided from the top of the camera to the bottom. Connected to the moving carriage is a flexible lifting cord 21 that will be connected in any suitable manner to a winding knob 22 associated with a release knob 23. When the carriage is in the lowermost position it can be raised by turning the winding knob 22 and held in the uppermost position by a pawl or the like (not shown) and released by the release member 23 when it will fall to the lower position under the influence of gravity. Supported in the moving carriage 19 is an upper mirror 24 conveniently placed diagonally and there is supported in the lower portion of the carriage a lower mirror 25. These two mirrors are placed at different angles. The mirror 24 totally reflects an image through an upper slot 26 in the moving carriage whilst the lower mirror 25 totally reflects an image through a lower slot 27 in the opposite side of the moving carriage. In a line between these two mirrors there is a slot 28 at the back of the carriage, the purpose of which is to enable a direct and third image to pass straight from the source of light through to the light sensitive material at the back. Each mirror will be supported in the moving carriage so as to retain a fixed position and will conveniently have a small spring 29 at the back for the same purpose.

The lens aperture is referenced 30. Associated with such aperture for the purpose of cutting off, admitting and again cutting off the source of light there may be upper and lower shutters 31 and 32 respectively. If so desired these shutters may be replaced by similarly functioning blinds in a manner that will be obvious to persons skilled in the trade. Each of these shutters will have a lug or extension and the upper shutter will be connected to a spring 33, the function of which is to return the upper shutter to its upper position when the carriage permits this to be done.

The camera functions in the following manner. When the release member 23 is operated the moving carriage 19 falls from the top position to the bottom under the influence of gravity. In doing so it first allows the lower shutter 32 to fall from its upper position which is that shown in Fig. 4 to its lower position which is that shown in Fig. 6. This uncovers the lens aperture with the result that the image is reflected by the mirror 24 through the aperture 26 at one side, by the mirror 25 through the aperture 27 to the other side and directly through the back aperture 28. Further movement downwards of the moving carriage 19 causes the upper part of such carriage to pull against the lug of the upper shutter 31 and thereby pulls such shutter so as to shut off the lens aperture which will be the case when the carriage reaches the bottom as shown in Fig. 7. It will be understood that the rate at which the carriage moves will in the absence of any restraining influence be a rate determined by unimpeded gravitational influence. Obviously this rate can be impeded in a controlled manner so as to give longer exposures. One way that this can be effected would be to put a damper or governor in association with the lifting cord 21. It is to be understood however that the means whereby the moving carriage is to be lifted or moved so as to effect controlled exposures is not the essence of the invention. Obviously movement of the carriage could be caused by or accelerated by using a spring or other similarly functioning means. The invention resides primarily in the use of a moving carriage that supports totally reflecting mirrors set at different angles so as to reflect images in different directions. A third image may be obtained direct from the source of light through the back of the camera.

I claim—

A camera of the character described comprising a rectangular casing having side walls, a front wall, a rear wall and end walls, slide guides arranged on the two sides and back walls of said casing for holding the slides containing the light sensitive material, said front wall having a lens opening therein, a slide arranged upon the front wall of said casing for supporting and guiding the moving shutters and lens of the camera about said lens opening, vertical guides positioned within said casing and one arranged at each corner thereof, a movable carriage, said carriage being of substantially the same height as that of the said lens opening and consisting of side walls, a rear wall and end walls, the front portion of said carriage being opened, the front opened portion of said carriage being of an area substantially equal to that of said lens opening of the casing and at times caused to register therewith, said carriage having slots formed in the corners thereof for receiving said vertical guides, means for moving said carriage upon the guides within said casing, a lower mirror arranged within said carriage for receiving the light rays from said lens opening and reflecting the image through an opening formed within one of the side walls of said carriage upon the light sensitive material arranged within one of the slide guides carried by said casing, an upper mirror arranged within said carriage in spaced relation to said lower mirror for receiving light rays from said lens opening and reflecting the same through an opening formed within the other of said side walls of said carriage upon the light sensitive material arranged within another slide guide carried by said casing and the rear wall of said carriage having an opening therein in line with the space between the two mirrors supported within said carriage whereby the light rays from said lens opening may travel directly through the opening formed in the rear wall of said carriage to the light sensitive material arranged within the slide guide at the back of said casing.

WILLIAM REGINALD HARRISON.